United States Patent Office 3,737,527
Patented June 5, 1973

3,737,527
SUBSTITUTED S-((4-OXO - 1,2,3-BENZOTRIAZIN-3(4H) - YL)METHYL) PHOSPHOROTHIOATES AND PHOSPHORODITHIOATES FOR CONTROLLING ARTHROPODS
Raymond H. Rigterink, Midland, Mich., assignor to The Dow Chemical Company, Midland, Mich.
No Drawing. Original application Apr. 1, 1969, Ser. No. 812,288, now Patent No. 3,622,578. Divided and this application Mar. 2, 1971, Ser. No. 120,330
Int. Cl. A01n 9/36
U.S. Cl. 424—200      11 Claims

ABSTRACT OF THE DISCLOSURE

Alkylthio-, alkylsulfinyl- and alkylsulfonyl-substituted S-((4-oxo - 1,2,3 - benzotriazin-3(4H)-yl)methyl)phosphorothioates and phosphorodithioates of the formula

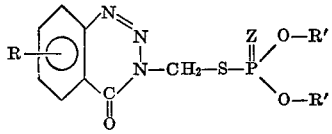

and methods employing and compositions comprising these substituted phosphorothioates and substituted phosphorodithioates for controlling parasites, especially arthropod pests such as insects and arachnids. In the above and succeeding formulae in the present specification and claims, Z represents oxygen or sulfur; R represents loweralkylthio, loweralkylsulfinyl or loweralkylsulfonyl; and each R' independently represents loweralkyl.

---

This application is a divisional application of U.S. application Ser. No. 812,288, now U.S. Patent 3,622,578.

The present invention is also directed to starting materials useful in the preparation of the above-described phosphorothioates and phosphorodithioates. These starting materials are of the following formula:

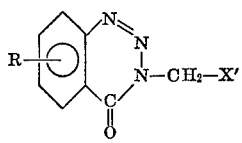

wherein X' represents bromo, chloro, or iodo.

DETAILED DESCRIPTION OF THE INVENTION

The present invention is directed to compounds of the formula

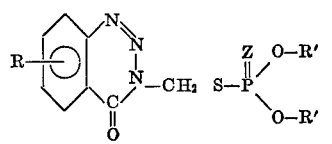

and to methods employing and compositions comprising these compounds for controlling arthropod pests such as insects and arachnids. In the above and succeeding formulae in the present specification and claims, Z represents oxygen or sulfur; R represents loweralkylthio, loweralkylsulfinyl or loweralkylsulfonyl; and each R' independently represents loweralkyl. The term "loweralkyl" is employed in the present specification and claims to designate an alkyl group having from 1 to 4 carbon atoms.

Typically, the compounds of the present invention are solids which are somewhat soluble in many common organic solvents and of very low solubility in water. The compounds are useful as parasiticides and are especially adapted to be employed as active toxicants in compositions for the control, and, in particular, for the selective control, of a number of arthropod pest organisms such as mites, ticks, southern army worms, flies and mosquitos.

The products of the present invention are prepared by reacting a phosphorothioic or phosphorodithioic acid having the formula

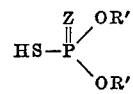

with an R-substituted (halomethyl)benzotriazinone compound of the formula

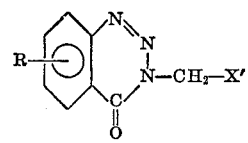

in the presence of a base, such as an alkali metal or ammonium carbonate or an alkali metal or ammonium hydroxide. In the above and succeeding formulae, X' is employed to designate bromo, chloro, or iodo. Alternately, the R-substituted (halomethyl)benzotriazinone is reacted with an alkali metal or ammonium salt of the phosphorothioic or phosphorodithioic acid.

The reaction conveniently is carried out in an inert organic liquid such as, for example, acetone, dimethylformamide, acetonitrile, carbon tetrachloride, chloroform, benzene, toluene, ethyl methyl ketone, isobutyl methyl ketone, methanol, ethyl acetate, methylene dichloride and the like. The amounts of the reactants to be employed are not critical, some of the desired product being obtained when employing the reactants in any amounts. In the preferred method of operation, good results are obtained when employing substantially equimolecular proportions of the R-substituted (halomethyl)benzotriazinone, phosphorothioic or phosphorodithioic acid, and the base; or when employing substantially equimolecular proportions of R-substituted (halomethyl)benzotriazinone and phosphorothioate or phosporodithioate salt. The reaction takes place smoothly at a halide liberating temperature, e.g., from about 0° to 125° C., but is preferably carried out at temperatures of from 20° to 65° C. The reaction results in the production of the desired product, and an alkali metal or ammonium chloride byproduct.

In carrying out the reaction, the reactants or reactants and base are mixed and contacted together, conveniently in a reaction medium, as specified above, and the resulting reaction mixture is maintained for a period of time in the reaction temperature range to complete the reaction. Following the completion of the reaction, the reaction mixture is washed with water to remove byproduct, and organic liquid reaction medium is removed by conventional procedures, typically, evaporation under subatmospheric pressure, to obtain the desired product as a residue. This product residue can be further purified by conventional procedures such as washing with water and dilute aqueous alkali metal hydroxide, solvent extraction, and recrystallization.

The desirable properties of the present products are inherent in the compounds as prepared; when the optimum in selective activities are of interest, the purified compounds usually are preferred. However, for many applications, wherein low cost is a major consideration, effective control and kill of parasites are realized using the product directly as prepared without separation or purification.

A preferred embodiment of the present invention consists of those subject compounds of the formula

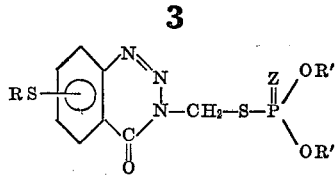

A yet more preferred sub-group of the subject compounds are those of the formula

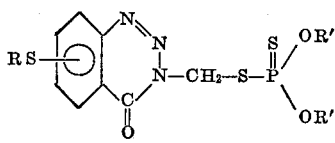

The compounds of these preferred sub-groups admit of ready synthesis and exhibit an excellent combination of the properties possessed by the subject compounds generally.

The following examples describe fully representative specific embodiments and the best mode contemplated by the inventor for practicing the present invention and will enable those skilled in the art to practice the same. Temperatures are given in Centigrade degrees.

EXAMPLE 1

O,O-diethyl S-((6-(methylthio)-4-oxo-1,2,3-benzotriazin-3(4H)-yl)methyl)phosphorodithioate O,O-diethyl phosphorodithioic acid (22.3 g.; 0.12 mole) was dissolved in 100 ml. acetone and 50% NaOH (9.6 g.; 0.12 mole) was added with stirring. 3-(chloromethyl)-6-(methylthio) - 1,2,3 - benzotriazin-4-(3H)-one (24.2 g.; 0.1 mole) was added with stirring. The mixture was heated under reflux with stirring for one hour. After cooling, 100 ml. benzene and 200 ml. water were added with stirring. The two layers were separated in a separatory funnel and the upper organic layer was washed three times with 50 ml. portions of water. The benzene was removed by evaporation. The residue was an orange-brown semi-solid and was purified by recrystallization from 100 ml. methanol. The purified product was a dark tan solid melting at 80°–82°. Elemental analysis gave 10.4% nitrogen and 24.2% sulfur (theoretical, 10.7% N and 24.5% S).

EXAMPLE 2

O,O-dimethyl S-((6-(methylthio)-4-oxo-1,2,3-benzotriazin-3(4H)-yl)methyl)phosphorodithioate O,O-dimethyl phosphorodithioic acid (24.6 g.; 0.155 mole) was dissolved in 100 ml. acetone and 1 ml. water. NaHCO$_3$ (16.0 g.; 0.191 mole) was added with stirring. 3-(chloromethyl) - 6 - (methylthio) - 1,2,3 - benzotriazin-4(3H)-one (24.2 g.; 0.1 mole) was added with stirring and the resulting mixture was heated under reflux for one hour. The reaction mixture was worked up in the same manner as in Example 1. The purified product was a pale yellow solid melting at 89.5°–91°. Elemental analysis gave 11.5% nitrogen and 26.5% sulfur (theoretical, 11.6% N and 26.4% S).

EXAMPLE 3

O,O-diethyl S-((6-(methylsulfinyl)-4-oxo-1,2,3-benzotriazin-3(4H)-yl)methyl)phosphorodithioate This compound was made by the method of Example 2, substituting O,O-diethyl phosphorodithioic acid for the corresponding O,O-dimethyl reactant and 3-(chloromethyl)-6-(methylsulfinyl - 1,2,3 - benzotriazin-4(3H)-one for the corresponding 6-(methylthio) reactant. The product was a light tan solid melting at 95°–97°. Elemental analysis gave 10.1% nitrogen and 23.3% sulfur (theoretical, 10.3% N and 23.6% S).

EXAMPLE 4

O,O-diethyl S-((6-(isopropylthio)-4-oxo-1,2,3-benzotriazin-3(4H)-yl)methyl)phosphorodithioate This compound was prepared by the method of Example 1, substituting 3-(chloromethyl)-6-(isopropylthio)-1,2,3-benzotriazin-4(3H)-one for the corresponding 6-(methylthio) reactant. The product was purified by recrystallization from petroleum ether. The purified product was a yellowish-tan solid melting at 66°–68°. Elemental analysis gave 10.0% nitrogen and 22.7% sulfur (theoretical, 10.0% N and 22.9% S).

EXAMPLE 5

O,O-diethyl S-((6-(isopropylsulfonyl)-4-oxo-1,2,3-benzotriazin-3(4H)-yl)methyl)phosphorodithioate This material was made by the procedure of Example 2, substituting O,O-diethyl phosphorodithioic acid for the corresponding O,O-dimethyl reactant and 3-(chloromethyl)-6-(isopropylsulfonyl) - 1,2,3 - benzotriazin - 4(3H)-one for the corresponding 6-(methylthio) reactant. The product was purified by recrystallization from methanol. The purified product was a white solid melting at 105°–107°.

EXAMPLE 6

O,O-diethyl S-((7-(methylsulfonyl)-4-oxo-1,2,3-benzotriazin-3(4H)-yl)methyl)phosphorodithioate This compound was made following the procedure of Example 3, substituting 3-(chloromethyl)-7-(methylsulfonyl)-1,2,3-benzotriazin-4(3H)-one for the 6-(methylsulfinyl) reactant. The purified product was a light tan solid melting at 158°–160°. Elemental analysis gave 9.8% nitrogen and 22.3% sulfur (theoretical, 9.9% N and 22.7% S).

Other representative products of the present invention are prepared in accordance with the procedures previously described, using the respective corresponding (chloromethyl)benzotriazinone compound and O,O-dialkyl phosphorothioic or O,O-dialkyl phosphorodithioic acid as starting materials. These other representative products are identified in the following table. In this table, as well as throughout the present specification, the symbol "M.W." is used as an abbreviation of the term "molecular weight."

EXAMPLES 7–12

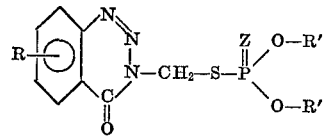

| Identity of compound | | | | Characterizing property, M.W. |
|---|---|---|---|---|
| R | Z | R' | R' | |
| 6-(n-butylthio) | S | Methyl | Methyl | 405.5 |
| 6-(methylthio) | S | n-Butyl | n-Butyl | 489.5 |
| 7-(i-butylsulfinyl) | S | Isopropyl | Isopropyl | 477.7 |
| 6-(methylsulfinyl) | S | Methyl | Methyl | 379.4 |
| 6-(ethylsulfinyl) | O | Ethyl | Ethyl | 405.5 |
| 6-(n-butylsulfonyl) | O | n-Butyl | Methyl | 463.4 |

The compounds of the present invention are useful as parasiticides and parasite repellents in a variety of household, industrial, and agricultural operations. In particular, the compounds are useful for the kill and control of arthropod pest organisms, such as arachnids, including mites, and ticks; and insects.

The compounds of the present invention are also effective for the control of many arthropod organisms found on the roots or aerial portions of growing plants, including mites, and chewing and sucking insects, such as southern army worm (*Prodenia eridania*), and two-spotted spider mite (*Tetranychus bimaculatus*).

The compounds of the present invention are also useful to control parasites which attack the exterior of animals, the so-called external parasites such as ticks, flies, and the like. In this application, the compounds can be applied directly onto the parasites; alternately, contact of these parasites with the compounds can be achieved by administering the compound to susceptible parasites and the host animals.

The methods of the present invention comprise contacting an arthropod with an inactivating amount of one or more of the present compounds. Contacting can be effected by application of the compound to the habitat of the arthropods. Representative habitats include soil, air, water, food, vegetation, other animal organisms, and the like. The inactivation can be lethal, immediately, or with delay, or can be a sub-lethal one in which the inactivated arthropod is not able to carry out one or more of its normal life processes. This latter situation prevails when one of the systems of the arthropod, typically the nervous system, is seriously disturbed. A preferred use of the present inventive compounds comprises their employment for the kill and control of insects and arachnids.

In use, the compounds of the present invention can sometimes be employed in unmodified form. Frequently, however, the desirable properties of such compounds can be utilized only when the compound is modified by the employment with it of a pesticidal adjuvant. Thus, for example, the present compounds are of very low solubility in water but are relatively soluble in oils, including plant essential oils. Accordingly, the application of the pure compound, even by the use of highly sophisticated techniques, to the surface of a plant, commonly results in its dispersion and loss in surface waxes or essential oils; or, in the common situation of early morning application when the plant is wet with dew, may result in run-off which leaves the plant with little or no applied product. Also, in aquatic settings, the desirable properties of the compounds can usually be utilized only when the compounds are modified by the employment of a pesticidal adjuvant. Moreover, the pure compound is attacked in outdoor situations by sunlight and air, whereas, incorporated in a pesticidal adjuvant the compounds often derive protection from such influences. Therefore, the practical enjoyment of the beneficial utilities of the present compounds often requires that the compounds be composited with one or more pesticidal adjuvant substances.

The compositions of the present invention can be liquids or dusts; and the adjuvants employed can be any one or a plurality of materials including aromatic solvents, petroleum distillates, water, or other liquid carriers, propellant substances, surface-active dispersing agents, light absorbers, and finely divided carriers solids. In such compositions, the adjuvant cooperates with the subject compound so as to obtain a composition to facilitate the method of the present invention, and to obtain an improved result. The use of either a surface-active dispersing agent or a finely divided carrier solid and the use of both a surface-active dispersing agent and a finely divided carrier solid, simultaneously, constitute preferred embodiments of compositions of the present invention. Other preferred embodiments of the present invention are compositions comprising one or more of the subject compounds, an organic liquid as a solvent and carrier therefor, and a propellant material. Numerous other embodiments will become available to those skilled in the art in view of the teachings set forth hereinbelow.

The exact concentration of one or more of the subject compounds in a composition thereof with one or a plurality of adjuvants can vary; it is necessary only that one or more of the compounds be present in such amount as to make possible the application of an inactivating dosage. In many situations, a composition comprising .001 percent of one, or a total of more than one, of the subject compounds is effective for the administration of an inactivating amount thereof to arthropod pest organisms. In other procedures, compositions comprising a lesser amount, such as .0001 percent of one, or more than one, of the subject compounds, or a greater amount, such as 0.05 percent or more of one, or more than one, of the subject compounds, are effective for the inactivation of arthropod organisms. In still other operations, compositions containing from 0.5 to 98 percent by weight of a subject compound, or from 0.5 to 98 percent of a total of more than one subject compound, are conveniently employed. In such compositions, preferred adjuvants are a surface-active agent or a finely divided carrier solid. Such compositions are adapted to be employed as treating compositions and applied to parasites and to their habitats, or to be employed as concentrates and subsequently diluted with additional adjuvant to produce ultimate treating compositions.

In the preparation of dust compositions, the subject compounds can be compounded with any of the finely divided carrier solids such as pyrophyllite, diatomaceous earth, gypsum and the like. In such operations, the finely divided carrier is ground or mixed with one or more of the compounds, as active agent, or wetted with a solution of the active agent in a volatile organic solvent. Similarly, dust compositions containing a subject compound can be similarly compounded from various of the solid dispersing agents, such as fuller's earth, attapulgite and other clays. These dust compositions can be employed as treating compositions or can be employed as concentrates and subsequently diluted with additional solid dispersing agent or with pyrophyllite, diatomaceous earth, gypsum and the like to obtain the desired amount of active agent in a treating composition. Also, such dust compositions can be dispersed in water, with or without the aid of surfactant, to form spray mixtures.

Further, one of the subject compounds or a dust concentrate composition containing such compound can be incorporated in intimate mixture with surface active dispersing agents such as ionic and nonionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate he dispersion of the concentrate in the liquid carrier to produce the desired spray composition.

In the preparation of liquid compositions, the subject compound can be compounded with a suitable water-immiscible organic liquid and surface active dispersing agent to produce an emulsifiable liquid concentrate which can be further diluted with water and oil to form spray mixtures in the form of oil-in-water emulsions. In such compositions, the carrier comprises an aqueous emulsion, that is, a mixture of water-immiscible solvent, emulsifying agent and water. Preferred dispersing agents to be employed in these compositions are oil-soluble and include the non-ionic emulsifiers such as the polyoxyethylene derivatives of sorbitan esters, complex ether alcohols and the like. However, oil-soluble ionic emulsifying agents such as mahogany soaps can also be used. Suitable organic liquids to be employed in the compositions include petroleum oils and distillates, toluene, liquid halohydrocarbons and synthetic organic oils.

In use, one or more of the subject compounds or a composition containing one or more of the compounds is applied to the pests to be controlled directly, or by means of application to a portion or portions of their habitat in any convenient manner, for example, by means of hand dusters or sprayers or by simple mixing with the food to be ingested by the organisms. Application to the foliage of plants is conveniently carried out with power dusters, boom sprayers and fog sprayers. In such foliar applications, the employed compositions should not contain any appreciable amounts of any phytotoxic diluents. In large scale operations, dusts, or low-volume sprays can be applied from an airplane. The present invention also comprehends the employment of compositions comprising one of the subject compounds, an adjuvant, and one or more other biologically active materials, such as insecticides, fungicides, miticides, bactericides, nematocides, and the like, or one or more synergistic materials.

A preferred and especially convenient manner for the application of one or more of the present products comprises the use of a self-pressurized pack formulation which can be used, for example, as a space or surface spray. Such a formulation can comprise one or more of the present compounds, an organic liquid as a solvent and vehicle therefore, and a propellant material which can be a condensed and compressed gas or a substance which, at room temperature, is a gas under atmospheric pressure but which liquifies under superatmospheric pressure. Where the propellant material is of the latter type, the self-pressurized pack formulation is often spoken of as an aerosol. Representative propellants include propane, butane, nitrogen, and the fluorinated hydrocarbons, such as dichlorodifluoromethane and trichlorofluoromethane. Generally, the propellant constitutes from 25 to 95 percent by weight of the total self-pressurized pack. As vehicle, there can be employed any liquid in which the desired amount of product is capable of being dispersed; preferred vehicles include petroleum distillates, kerosene, and methylene chloride. The self-pressurized pack formulation can also include other materials, such as other biologically active agents or synergists. For further discussion of the use of self-pressurized pack formulations, see U.S. Pats. 1,892,750 and 2,321,023.

The control of pest organisms by the contacting thereof with one or more of the subject compounds illustrated by the following examples.

EXAMPLE 13

Aqueous compositions, each containing one of the present compounds, are prepared as follows:

4 parts by weight of one of the subject compounds, 0.08 part of sorbitan trioleate and 0.02 part of a sorbitan monolaurate polyoxyethylene derivative are dispersed in 40 milliliters of acetone to produce a concentrate composition in the form of a water-dispersible liquid. This concentrate composition is dispersed in water to provide aqueous compositions containing varying amounts of the subject compound employed.

In this manner, aqueous compositions are separately prepared with each of

O,O-diethyl S-((6-(methylthio)-4-oxo-1,2,3 benzotriazin-3-(4H)-yl)methyl)phosphorodithioate;
O,O-dimethyl S-((6-(methylthio)-4-oxo-1,2,3-benzotriazin-3-(4H)-yl)methyl)phosphorodithioate;
O,O-diethyl S-((6-(methylsulfinyl)-4-oxo-1,2,3-benzotriazin-3-(4H)-yl)methyl)phosphorodithioate;
O,O-diethyl S-((6-(isopropylthio)-4-oxo-1,2,3-benzotriazin-3(4H)-yl)methyl)phosphorodithioate;
O,O-diethyl S-((6-(isopropylsulfonyl)-4-oxo-1,2,3-benzotriazin-3(4H)-yl)methyl)phosphorodithioate and
O,O-diethyl S-((7-(methylsulfonyl)-4-oxo-1,2,3-benzotriazin-3(4H)-yl)-methyl)phosphorodithioate.

EXAMPLE 14

In further operations, aqueous compositions, each containing one of the compounds of the present invention, are prepared as follows:

A known quantity of one of the subject compounds is mixed with a quantity of water, a quantity of an alkyl aryl sulfonate, and a quantity of a substituted benzoid alkyl sulphonic acid, and the resulting mixture ballmilled together to produce a composition containing 4000 parts by weight of the compound employed, 300 parts by weight of alkyl aryl sulfonate and 300 parts by weight of substituted benzoid alkyl sulphonic acid, per million parts of ultimate composition.

In this procedure, there are prepared aqueous compositions from each of the compounds identified in Examples 1 through 6.

Compositions prepared according to these procedures of Example 14 can be employed as treating compositions or can be diluted with additional quantities of water to prepare aqueous treating compositions of lesser concentrations.

EXAMPLE 15

The compounds in accordance with the present invention can also be employed to prepare aerosol compositions which are particularly effective for localized control of pest organisms in and around houses, barns, and the like.

In representative operations, an aerosol formulation containing 1 percent of one of the subject compounds, 51 percent of a petroleum distillate, and 48 percent of dichlorodifluoromethane is prepared by dispersing the subject compound in the petroleum distillate and placing the resulting dispersion and liquid dichlorodifluoromethane within a closed cylinder provided with an orifice, opening of which is controlled by a valve operable from the exterior of the cylinder. In this manner, aerosol formulations are prepared with each of the compounds identified in Examples 1 through 6.

These compositions are particularly adapted to be employed as aerosol compositions for the control of insects, such as flies, mosquitoes, ticks and the like.

EXAMPLE 16

An aqueous treating composition containing 100 parts of O,O - diethyl S-((6-(methylthio)-4-oxo-1,2,3-benzotriazin - 3(4H)-yl)methyl)phosphorodithioate per million parts by weight of ultimate aqueous treating composition was prepared according to the procedures of the foregoing examples. Houseflies (*Musca domestica*) were uniformly wetted briefly with this aqueous treating composition and thereafter observed for mortality for 72 hours. Within the first two hours following such treatment, more than 80 percent of the treated houseflies were inactivated. At the end of 72 hours, a 100 percent kill of the treated houseflies was observed.

EXAMPLE 17

Essentially the same results as in Example 16 were obtained when O,O - diethyl S-((6-(methylsulfinyl)-4-oxo-1,2,3 - benzotriazin-3-(4H)-yl)methyl)phosphorodithioate was employed in the procedure of Example 16.

EXAMPLE 18

Compositions were prepared according to the procedures of Examples 13 and 14, each such composition containing 500 parts of one of the compounds of Examples 1 and 3 as sole toxicant per million parts by weight of ultimate treating composition. Stands of cranberry bean plants heavily infested with two-spotted spider mites in the egg and adult stages were separately wetted briefly with the treating compositions, the treated plants permited to dry, and the treated and dried plants held under favorable agricultural conditions for a period of about 5 days. At the end of this period, the plants were examined. In all cases, 100 percent kill and control of two-spotted spider mites in the adult stage were observed. In the egg stage, 51 to 80 percent ovicidal activity was noted.

EXAMPLE 19

Aqueous compositions were prepared containing 5 parts per million by weight of one of the compounds O,O-diethyl S-((6-(methylthio)-4-oxo-1,2,3 benzotrizin-3-(4H)-yl)methyl)phosphorodithioate,
O,O-dimethyl S-((6-(methylthio)-4-oxo-1,2,3-benzotriazin-3((4H)-yl)methyl)-phosphorodithioate,
O,O-diethyl S-((6-(methylsulfinyl)-4-oxo-1,2,3-benzotriazin-3(4H)-yl)methyl)phosphorodithioate, O,O-diethyl S-((6-(isopropylthio)-4-oxo-1,2,3-benzo-
triazin-3(4H)yl)methyl)phosphorodithioate,
O,O-diethyl S-((6-(isopropylsulfonyl)-4-oxo-1,2,3-benzo-
triazin-3(4H)-yl)-methyl)phosphorodithioate and
O,O-diethyl S-((7-(methylsulfonyl)-4-oxo-1,2,3-benzo-
triazin-3(4H)-yl)methyl)-phosphorodithioate as sole toxicant. Approximately 50 yellow fever mosquito larvae were placed in each of the treated solutions and observed after three days. At this time, none of the larvae had survived. With comparable, untreated check solutions, all of the larvae survived.

EXAMPLE 20

Ten unfed adult lone star ticks (*Ambyloma americanum*) were dipped into an acetone solution containing 100 milligrams of O,O-diethyl S-((6-(methylthio)-4-oxo-1,2,3 - benzotriazin-3(4H)-yl)methyl)phosphorodithioate per 100 milliliters of acetone and held therein for three seconds, then dried on absorbent paper and put into observation vials. On the fourth day after treatment, none of the lone star ticks had survived. With a comparable untreated check solution under conditions otherwise the same, all lone star ticks survived.

The procedure just described was repeated with brown dog ticks (*Rhipicephalus sanguineus*). Again, none of the treated brown dog ticks survived. With a comparable untreated check solution under conditions otherwise the same, all brown dog ticks survived.

The R-substituted (halomethyl)benzotriazinone compounds employed as starting materials in the preparation of the products of the present invention are themselves prepared by the reaction of the corresponding (hydroxymethyl)benzotriazinone compounds):

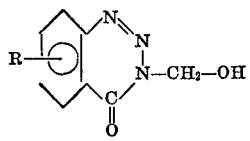

with a halogenating agent such as hydrochloric acid, hydrobromic acid, hydriodic acid or othionyl chloride. The reaction is conveniently carried out in an inert liquid reaction medium, such as, for example, hydrocarbons, chlorinated hydrocarbons, or ketones. The reaction consumes the reactants in amounts representing equimolecular proportions; but better yields are usually obtained by employing an excess of the halogenating agent, such as from one to ten molecular proportions of halogenating agent per molecular proportion of the (hydroxymethyl) benzotriazinone compound.

The reaction goes forward readily under a wide range of temperatures, such as from 20° C. to the reflux temperature of the reaction medium. The reaction results in the preparation of the desired R-substituted (halomethyl)benzotriazinone compound; by-products vary in accordance with the identity of the halogenating agent.

In carrying out the reaction, the reactants are contacted with one another in liquid reaction medium; the reaction goes forward almost immediately upon the contacting of the reactants, but higher yields are often obtained by maintaining the reaction mixture for a period of time following completion of the contacting of the reactants. By-products are removed in conventional procedures, leaving a reaction medium containing the desired (halomethyl)benzotriazinone starting material; it can be separated from the reaction medium, and, if desired, purified, in conventional procedures.

The R-substituted (halomethyl)benzotriazinone compounds are useful as starting materials in the synthesis of the products of the present invention.

The following examples illustrate the embodiment of the present invention in the R-substituted (halomethyl)-benzotriazinone compounds, and will enable those skilled in the art to practice the same.

EXAMPLE 21

3-(chloromethyl)-6-(methylthio)-1,2,3-benzotriazin-4(3H)-one

3 - (hydroxymethyl) - 6 - (methylthio) - 1,2,3-benzotriazin-4(3H)-one (89 g.; 0.4 mole) was suspended in 400 ml. chloroform and thionyl chloride (71.4 g.; 0.6 mole) was added with stirring. The resulting mixture was heated under reflux with stirring for one hour, giving a clear solution. The solvent and most of the excess thionyl chloride was removed by vacuum distillation. The dark brown viscous oily residue was dissolved in 100 ml. acetone and added to 500 ml. water with stirring. After cooling in an ice water bath, the precipitated product was removed by suction filtration, washed with cold water, and dried in a vacuum oven at about 60°. The product was a light brown solid melting at 91°–94°. Elemental analysis gave 17.1% nitrogen, 14.7% chlorine, and 12.8% sulfur (theoretical, 17.4% N, 14.7% Cl, and 13.2% S).

EXAMPLE 22

3-(chloromethyl)-6-(methylsulfinyl-1,2,3-benzotriazin-4(3H)-one

3 - (chloromethyl) - 6 - (methylthio) - 1,2,3 - benzotriazin-4-(3H)-one (8 g.; 0.03 mole) was dissolved in 50 ml. acetic acid by warming to 42° with stirring. H$_2$O$_2$ (30% aqueous solution; 7.5 g.; 0.066 mole) was added all at once with stirring. Stirring was continued for 2 hrs. longer allowing the temperature to drop to room temperature. The reaction mixture was extracted with 100 ml. chloroform and the chloroform was removed by evaporation. The residue was an oily solid, which was purified by recrystallization from 100 ml. methanol. The product was a tan solid melting at 188°–189° (dec.). Elemental analysis gave 13.7% chlorine, 16.0% nitrogen, and 12.2% sulfur (theoretical, 13.8% Cl, 16.3% N, and 12.4% S).

EXAMPLE 23

3-(Chloromethyl)-6-(isopropylsulfonyl)-1,2,3-benzotriazin-4(3H)-one 3-(chloromethyl)-6-(isopropylthio)-1,2,3 - benzotriazin-4(3H)-one was oxidized with 4 equivalents of aqueous H$_2$O$_2$ in acetic acid at 70°–80° for 2 hrs. The product was purified by recrystallization from methanol. The purified product was a white solid melting at 130–132°. Elemental analysis gave 11.5% chlorine and 13.9% nitrogen (theoretical, 11.8% Cl and 13.9% N).

EXAMPLES 24–28

Other representative R-substituted (halomethyl)-benzotriazinone compounds, prepared from halogenating agent and the corresponding R-substituted (hydroxymethyl)-benzotriazinone compound in accordance with the procedures of the foregoing teachings and examples, are the following: 3-(chloromethyl)-6 - (isopropylthio) - 1,2,3-benzotriazin-4(3H)-one, melting at 44°–47°, M.W. 269.7; 3-(chloromethyl)-7-(methylsulfonyl)-1,2,3 - benzotriazin-4(3H)-one, melting at 190°–192° (dec.), M.W. 273.7; 3-(chloromethyl)-6-(n-butylsulfonyl)-1,2,3-benzotriazin - 4 (3H)-one, M.W. 315.7; 3-bromomethyl)-6-(ethylsufinyl)-1,2,3-benzotriazin-4(3H)-one, M.W. 316.1; nad 3-(iodomethyl)-7-(propylthio)-1,2,3-benzotriazin - 4(3H) - one, M.W. 361.1.

The R - substituted (hydroxymethyl)benzotriazinone compounds which are used in the preparation of the corresponding (halomethyl)benzotriazinone starting materials, and which are of the following structural formula:

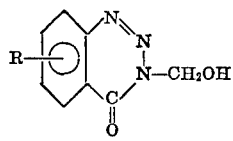

are prepared by a two-step reaction. This reaction comprises diazotization of an anthranilamide to obtain a 1,2,3-benzotriazin-4(3H)-one which is then treated with formaldehyde to obtain the desired (hydroxymethyl)-benzotriazinone compounds:

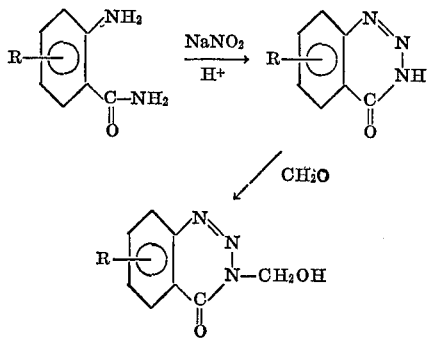

The diazotization and the treatment with formaldehyde are carried out in standard procedures.

The (lower alkylthio)-substituted anthranilamide starting materials are prepared starting with thiocyano-substituted anthranilamide. The thiocyano substitution is achieved by reacting anthranilamide with an alkali metal or ammonium thiocyanate in the presence of chlorine or bromine. The reaction is carried out in the presence of an inert solvent such as a lower alkanol. The reaction consumes the reactants in equimolar proportions. However, to obtain good yields, proportions of about 2.5 moles of alkali metal or ammonium thiocyanate, one mole of anthranilamide and one mole of halogen are used. The reaction goes forward readily under an alkali metal or ammonium halide-liberating temperature, such as from 0°−+10° C. The reaction results in the preparation of the desired thiocyanoanthranilamide.

In carrying out the reaction, the anthranilamide and thiocyanate are advantageously suspended in a lower alkanol, the suspension is cooled advantageously to 0°−+10° C., and molecular chlorine or bromine is gradually added so that the exotherm does not increase the reaction temperature above 10° C. Upon completion of the addition of the halogen, the reaction mixture is poured into ice water. Thiocyanoanthranilamide precipitates as the thiocyanic acid salt. Product thiocyanoanthranilamide is liberated from the thiocyanic acid by adding sodium carbonate or equivalent base to a pH of about 7 to 8, and filtering.

The lower alkylthio-substituted anthranilamide is prepared by reacting a lower alkyl halide with the thiocyanoanthranilamide in the presence of a base. The reaction is conveniently carried out in a lower alkanol having the same number of carbon atoms as the lower alkyl halide reactant. The reaction consumes the reactants in equimolar proportions, and such proportions are preferred. The reaction goes forward at a sodium cyanide liberating temperature, whereby product (alkylthio)anthranilamide is formed. Advantageously, the reaction is carried out at the boiling temperature.

In carrying out the reaction, the reactants are contacted with one another while suspended in the reaction medium, and aqueous sodium hydroxide or equivalent base is added dropwise thereto. After reaction, by-product inorganic salts are removed by conventional procedures leaving a reaction medium containing the desired (alkylthio)-anthranilamide. It is separated and purified in a conventional manner.

In a representative procedure, one mole thiocyanoanthranilamide and one mole of methyl chloride are suspended in methanol. Two molar proportions of aqueous sodium hydroxide are added thereto dropwise, and the reaction medium is maintained at the boiling temperature for about thirty minutes. The reaction mixture is then evaporate to dryness, taken up in methylene chloride, the methylene chloride solution washed with water and then dried. The methylene chloride solution is then evaporated to dryness and crystalline product 4-(methylthio)anthranilamide is recovered.

The (lower alkylsulfinyl)- and (lower alkylsulfonyl)-substituted (halomethyl)benzotriazinones are prepared from the corresponding (lower alkylthio)-substituted compounds by oxidation with aqueous 30% $H_2O_2$ in acetic acid, as shown in Examples 22 and 23.

I claim:
1. A method which comprises contacting an arthropod with an amount sufficient to inactivate said arthropod of an active compound of the formula

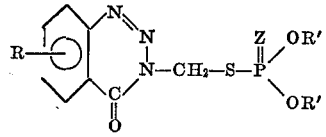

wherein Z represents oxygen or sulfur; R represents an alkylthio, alkylsulfinyl or alkylsulfonyl group having from 1 to 4 carbon atoms; and each R' independently represents an alkyl group having from 1 to 4 carbon atoms.

2. The method of claim 1 wherein the contacting is carried out by applying the active compound to a habitat of the arthropod.

3. The method of claim 1 wherein the active compound is O,O-dimethyl S-((6-(methylthio)-4-oxo-1,2,3-benzotriazin-3(4H)-yl)methyl)phosphorodithioate.

4. The method of claim 1 wherein the active compound is O,O-diethyl S-((6-(methylthio)-4-oxo-1,2,3-benzotriazin-3(4H)-yl)methyl)phosphorodithioate.

5. The method of claim 1 wherein the active compound is O,O-diethyl S-((6-(methylsulfinyl)-4-oxo-1,2,3-benzotriazin-3(4H)-yl)methyl)phosphorodithioate.

6. The method of claim 1 wherein the active compound is O,O-diethyl S-((6-(isopropylthio)-4-oxo-1,2,3-benzotriazin-3(4H)-yl)methyl)phosphorodithioate.

7. A composition for controlling arthopods comprising a surface-active dispersing agent and an active compound of the formula

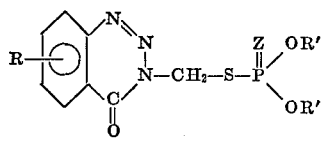

in amount sufficient to inactivate arthropods wherein Z represents oxygen or sulfur; R represents an alkylthio, alkylsulfinyl or alkylsulfonyl group having from 1 to 4 carbon atoms; and each R' independently represents an alkyl group having from 1 to 4 carbon atoms.

8. The composition of claim 7 wherein the active compound is O,O-dimethyl S-((6-(methylthio)-4-oxo-1,2,3-benzotriazine-3(4H)-yl)methyl)phosphorodithioate.

9. The composition of claim 7 wherein the active compound is O,O-diethyl S-((6-(methylthio)-4-oxo-1,2,3-benzotriazin-3(4H)-yl)methyl)phosphorodithioate.

10. The composition of claim 7 wherein the active compound is O,O-diethyl S-((6-(methylsulfinyl)-4-oxo-1,2,3 - benzotriazin - 3(4H) - yl)methyl)phosphorodithioate.

11. The composition of claim 7 wherein the active compound is O,O-diethyl S-((6-(isopropylthio)-4-oxo-1,2,3 - benzotriazin - 3(4H) - yl)methyl)phosphorodithioate.

References Cited
FOREIGN PATENTS 1,019,570  2/1966  Great Britain _____ 424—200

ALBERT T. MEYERS, Primary Examiner
F. E. WADDELL, Assistant Examiner